United States Patent Office 3,037,057
Patented May 29, 1962

3,037,057
PRODUCTION OF AROMATIC AMINOALCOHOLS
Samuel W. Tinsley, South Charleston, and John T. Fitzpatrick, Charleston, W. Va., assignors to Union Carbide Corporation, a corporation of New York
No Drawing. Filed Jan. 23, 1959, Ser. No. 788,514
9 Claims. (Cl. 260—578)

The present invention relates to aromatic aminoalcohols, and is especially concerned with improved processes for the production of ring-substituted mono- and diamine derivatives of both phenyalkyl alcohols and phenoxyalkyl alcohols, such processes involving the intermediate production of the corresponding nitrophenylalkyl nitrates and nitrophenoxyalkyl nitrates. In addition, the intermediate dinitrophenoxyalkyl nitrate products, as well as the diaminophenoxyalkyl alcohols of the invention, constitute new compositions of matter.

The broad range of aromatic aminoalcohols produced in accordance with the processes of this invention can be represented by the general formula:

I

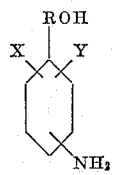

wherein R designates a member of the class consisting of the alkylene and oxyalkylene radicals containing at least 2 carbon atoms and preferably from 2 to about 6 carbon atoms, the oxyalkylene radicals being connected to the phenyl ring through the oxygen atom thereof; X designates a member of the class consisting of hydrogen, halogen, and the lower alkyl and lower alkoxy radicals containing up to about 4 carbon atoms; Y designates a member of the class consisting of hydrogen, halogen, the lower alkyl and lower alkoxy radicals containing up to about 4 carbon atoms and the amino radical (—$NH_2$); and wherein the hydroxyl radical is connected to the phenyl ring through a carbon chain containing at least 2 carbon atoms.

In particular, it is the diaminophenoxyalkyl alcohols represented above by formula I wherein R designates an oxyalkylene radical and Y designates an amino radical that constitute new compositions of matter.

As typical of the aromatic aminoalcohol products of this invention, there can be mentioned the following:

2-(para-aminophenyl)-1-ethanol
2-(meta-chloro-para-aminophenyl)-1-ethanol
2-(meta-ethyl-para-aminophenyl)-1-ethanol
3-(meta-methoxy-para-aminophenyl)-2-propanol
2-(ortho-methyl-para-aminophenyl)-1-ethanol
3-(ortho,ortho'-dichloro-para-aminophenyl)-1-propanol
4-(meta-ethoxy-para-aminophenyl)-1-butanol
2(-ortho-aminophenyl)-1-ethanol
2-(ortho,para-diaminophenyl)-1-ethanol
3-(para-ethyl-ortho-aminophenyl)-1-propanol
6-(para-aminophenyl)-1-hexanol
2-(ortho,para-diaminophenoxy)-1-ethanol
2-(meta-chloro-ortho,para-diaminophenoxy)-1-ethanol
2-(meta-ethyl-ortho,para-diaminophenoxy)-1-ethanol
3 - (meta - methoxy - ortho,para - diaminophenoxy) - 2 - propanol
2-(ortho-methyl-ortho',para-diaminophenoxy)-1-ethanol
3-(ortho,ortho'-dichloro-para-aminophenoxy)-1-propanol
2-(para-aminophenoxy)-1-ethanol
4-(meta-ethoxy-ortho, para-diaminophenoxy)-1-butanol
6-(ortho, para-diaminophenoxy)-1-hexanol Heretofore, the production of aminophenylalkyl alcohols wherein the readily available corresponding phenylalkyl alcohols are employed as starting materials, has ordinarily entailed a complex number of steps involving: (a) acetylation of the phenylalkyl alcohol to an acetate ester; (b) nitration of the acetate ester to a nitrophenyl derivative; (c) hydrolysis of the nitrophenyl derivative to the corresponding nitrophenylalkyl alcohol; and (d) hydrogenation of the nitrophenylalkyl alcohol so as to obtain the desired aminophenylalkyl alcohol. Unfortunately, as a consequence of this complex procedure, the production of aminophenylalkyl alcohols from phenylalkyl alcohols has to the present time, represented costly, time-consuming and inconvenient operations.

The disadvantages of the prior art can now be overcome through the practice of this invention, whereby aminophenylalkyl alcohols are produced from the corresponding phenylalkyl alcohols through direct processes based upon a convenient, two-step operation, as described below. Moreover, such procedures have been found equally applicable to starting materials consisting of phenoxyalkyl alcohols, thus yielding novel and valuable classes of compounds, namely, dinitrophenoxyalkyl nitrates and diaminophenoxyalkyl alcohols.

In its broadest aspect, the invention comprises the initial step of nitrating a phenylalkyl alcohol or phenoxyalkyl alcohol represented by the general formula:

II

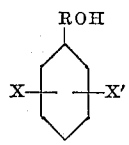

wherein R and X are as defined above, X' designates a member independently selected from the same class of substituents as that designated by X and wherein the hydroxyl radical is connected to the phenyl ring through a carbon chain containing at least 2 carbon atoms, so as to form the corresponding nitronitrate ester represented by the general formula:

III

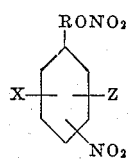

wherein R and X are as defined above, Z designates a member of the class consisting of hydrogen, halogen, the lower alkyl and lower alkoxy radicals containing up to about 4 carbon atoms and the nitro radical ($NO_2$) and wherein the nitrate radical (—$ONO_2$) is connected to the phenyl ring through a carbon chain containing at least 2 carbon atoms. The desired aromatic aminoalcohol can thereafter be obtained upon the hydrogenation of the nitronitrate ester. Of the nitronitrate esters herein described it is the dinitrophenoxyalkyl nitrates represented above by Formula III wherein R designates an oxyalkylene radical and Z designates a nitro radical that constitute new compositions of matter.

Among the phenylalkyl alcohols and phenoxyalkyl alcohols suitable for use as starting materials in the processes of the invention there can be mentioned the following although others can also be employed:

2-phenyl-1-ethanol
2-(meta-chlorophenyl)-1-ethanol
2-(meta-ethylphenyl)-1-ethanol
3-(meta-methoxyphenyl)-2-propanol
2-(ortho-methylphenyl)-1-ethanol
3-(ortho, ortho'-dichlorophenyl)-1-propanol
4-(meta-ethoxyphenyl)-1-butanol
3-(para-ethylphenyl)-1-propanol 6-phenyl-1-hexanol
2-phenoxy-1-ethanol
2-(meta-chlorophenoxy)-1-ethanol
2-(meta-ethylphenoxy)-1-ethanol
3-(meta-methoxyphenoxy)-2-propanol
2-(ortho-methylphenoxy)-1-ethanol
3-(ortho, ortho'-dichlorophenoxy)-1-propanol
4-(meta-ethoxyphenoxy)-1-butanol
6-phenoxy-1-hexanol In an embodiment of the invention, a phenylalkyl alcohol or phenoxyalkyl alcohol, as represented above by Formula II, is reacted with a nitrating agent preferably containing at least 2 moles of nitric acid for each mole of alcohol undergoing reaction, so as to convert the alcohol to the corresponding nitronitrate ester. A convenient nitrating agent, for example, and one which has engendered especially good results in the processes of the invention, comprises a mixture of sulfuric acid and nitric acid, preferably in a ratio of about 2 parts by weight of concentrated sulfuric acid per part of 60 percent nitric acid. The particular nitrating agent employed is not critical to the invention, however, hence other conventional nitrating agents such as anhydrous or fuming nitric acid can also be utilized in the processes of the invention with beneficial effect. In this connection, it has been found that the addition of water tends to have a depressing effect upon the rate of reaction, water being formed as a consequence of nitration. Thus, the more anhydrous nitrating agents are preferably employed.

The nitration reaction is generally carried out at temperatures below about 10° C. with best results realizable using reaction temperature below about 0° C. Moreover, while the nitration is preferably conducted under atmospheric pressure, somewhat higher or lower pressures can also be used with satisfaction.

The nitration of the benzene ring of both the phenylalkyl alcohols and phenoxyalkyl alcohols in accordance with the processes of the invention, appears to be ortho, para-directed, following well known rules of substitution, with nitration occurring most readily in the para-position when that position is unsubstituted. Thus, the nitration of unsubstituted phenylalkyl alcohols will ordinarily yield a nitronitrate ester product containing predominantly a para-nitrophenylalkyl nitrate, while minor amounts of an ortho-nitrophenylalkyl nitrate may also be produced in a mixture therewith. Of the isomers, the para-nitro derivative is more easily isolated since it is more insoluble in water and acids and is therefore more readily crystallized out of the crude nitration product. In addition, it is also possible by a control of operating variables within the scope of the invention to obtain an ortho, para-dinitrophenylalkylnitrate as the major nitrated product. The latter product may be formed, for example, by utilizing more concentrated nitrating agents and by carrying out the nitration at higher reaction temperatures within the operable temperature range, i.e., not exceeding about 10° C. On the other hand, where the phenylalkyl alcohol employed as a reactant is substituted in the para-position by a substituent such as a halogen or a lower alkyl or lower alkoxy radical, the ortho-nitrophenyl derivative will constitute the predominant product. It is to be noted, however, that the presence of such substituents at the meta-position or at only one of the ortho-positions of the phenylalkyl alcohol react will not substantially affect the orientation of nitration as described above.

The nitration of phenoxyalkyl alcohols so as to produce nitrophenoxyalkyl nitrates has been found to take place even more readily than the nitration of phenylalkyl alcohols. Consequently, the nitration of unsubstituted phenoxyalkyl alcohols generally results in the formation of an ortho, para-dinitrophenoxyalkyl nitrate. Moreover, as in the case of substituted phenylalkyl alcohols, the use of a substituted phenoxyalkyl alcohol reactant will, under certain circumstances, determine the orientation of nitration. For instance, when the phenoxyalkyl alcohols is substituted by halogen or lower alkyl or lower alkoxy radicals at both ortho-positions, a para-mononitrophenoxy derivative will constitute the predominant product. Similarly, the presence of such substituents at the meta-position or at only one of the ortho-positions of the phenoxyalkyl alcohols reactant will not substantially affect the orientation.

In carrying out the nitration, the alcohol reactant and the nitrating agent are admixed in a suitable reactor, preferably by the addition of the alcohol to the nitrating agent. Since the nitration is exothermic, it is desirable to remove the heat of reaction, as for example, by surrounding the reactor with a Dry Ice and acetone bath or by circulating brine through coils which are immersed in the reaction mixture. The rate at which the reactants are introduced generally is determined by the rapidity with which the heat of reaction can be dissipated so that the desired temperature can be maintained.

Upon completion of the nitration, the nitronitrate ester thereby formed, represented above by Formula III, is separated from the nitrated product. Any convenient separation procedure can be employed. For example, the nitrated product can be poured onto ice, whereupon the nitronitrate ester is crystallized out and can be recovered by filtration. The nitronitrate ester is subsequently reacted with hydrogen so as to produce the corresponding aromatic aminoalcohol.

The hydrogenation is ordinarily carried out by dispersing or dissolving the nitronitrate ester in a suitable solvent such as those commonly employed in liquid-phase hydrogenations, e.g., dioxane, ethyl alcohol, isopropyl alcohol and the like. The dispersion or solution of the nitronitrate ester is then introduced to a hydrogenation zone wherein the nitronitrate ester is reacted with hydrogen in the presence of a conventional hydrogenation catalyst. As typical of the hydrogenation catalysts of use in the invention there can be mentioned Raney nickel, platinum oxide, palladium etc. Preferably, the hydrogenation catalyst is incorporated in the reaction mixture in a concentration of from about 0.5 to about 5 percent by weight of the nitronitrate ester. The amount of catalyst is not narrowly limited, however, hence higher or lower catalyst concentrations can also be employed satisfactorily.

The hydrogenation is conveniently conducted at a temperature in the range of between about 0° C. to about 120° C., utilizing a hydrogen pressure of from about 15 pounds per square inch to about 2000 pounds per square inch, although somewhat higher or lower temperatures and pressures can also be employed. Within these temperature ranges, operation at a temperature of between 40° C. and 90° C. and at a hydrogen pressure of between 100 pounds per square inch and 1000 pounds per square inch is preferred.

Upon completion of the hydrogenation, as determined, for instance, by a cessation in the absorption of hydrogen, the aromatic aminoalcohol thereby formed, represented above by formula I, is separated from the hydrogenated product. Any convenient separation procedure can be utilized. A suitable separation procedure, for example, involves filtering the ordinarily liquid, hydrogenated product in order to remove the hydrogenation catalyst. The filtrate is then stripped of solvent, generally at reduced pressure, so as to obtain the aromatic aminoalcohol product as a residue. The aromatic aminoalcohol can thereafter be recovered in substantially pure form by recrystallization from a suitable solvent such as benzene, ethanol, combinations thereof and the like.

The aromatic aminoalcohols produced in accordance with the process of this invention can find use in a number of diverse applications. By way of illustration, the aromatic aminoalcohols may be employed as dye intermediates. U.S. Patent 2,659,740, for example, describes the use of an aminophenylalkyl alcohol in the manufacture of aminoanthraquinone derivatives which, in turn, serve as valuable dyes of cellulose alkylcarboxylate esters.

In particular, the novel diaminophenoxyalkyl alcohols of the invention also find utility as cross-linking or hardening agents for various resin compositions such as epoxy resins.

The invention can be illustrated further in connection with the following specific examples of its practice, although not necessarily limited thereto.

*Example 1*

To a solution prepared by admixing 2560 grams of concentrated sulfuric acid and 125 grams of 60 percent nitric acid, contained in a reaction flask, there were slowly added with stirring 61 grams of 2-phenyl-1-ethanol. During the addition, the temperature of the reaction mixture was maintained at approximately −20° C. by means of a Dry Ice-acetone bath surrounding the flask. Upon the complete addition of the alcohol, the nitrated product was poured onto ice and filtered. The crude 2-(para-nitrophenyl)-1-ethyl nitrate thus obtained weighed 114 grams. The nitronitrate ester was then purified by slurrying it with 100 grams of methanol, cooling the slurry to a temperature of −5° C. and filtering the cooled slurry. The 2-(para-nitrophenyl)-1-ethyl nitrate product was thereby recovered in an 85-gram yield and had a melting point of 39° C. to 43° C. Upon recrystallization from methanol, the product exhibited the following properties: melting point: 44° C. to 45° C.; elemental analysis in percent by weight:

|   | Found | Calculated for $C_8H_8O_5N_2$ |
|---|---|---|
| N | 12.93 | 13.19 |

*Example 2*

A mixture containing 100 grams of the 2-(para-nitrophenyl)-1-ethylnitrate product obtained as described in Example 1, 1000 milliliters of isopropyl alcohol and 20 grams of a Raney nickel hydrogenation catalyst was charged to a 3-liter hydrogenation bomb and heated at a temperature of about 70° C., under a hydrogen pressure of 1000 pounds per square inch. After a reaction period of 6 hours had elapsed, the bomb was opened and an additional 10 grams of Raney nickel added. The hydrogenation was then continued at approximately the same temperature and hydrogen pressure as before. After a further reaction period of 2 hours had elapsed, absorption of hydrogen was no longer observed. The hydrogenated product was filtered to remove the catalyst and stripped of isopropyl alcohol at a temperature of 35° C., under reduced pressure. Benzene was then added to the residue, and the resulting solution cooled to a temperature of 5° C., whereupon 46 grams of 2-(para-aminophenyl)-1-ethanol were obtained. The product had a melting point of between 98° C. and 102° C.

The hydrogenation of 80 grams 2-(para-nitrophenyl)-1-ethyl nitrate was repeated in a manner similar to that described above, utilizing however, 10 grams of a 5 percent by weight platinum-on-alumina hydrogenation catalyst instead of Raney nickel and employing a reaction temperature maintained between 40° C. and 50° C. Upon crystallization from benzene, a 50-gram yield of 2-(para-aminophenyl)-1-ethanol was obtained. The product had a melting point of between 107° C. and 109° C.

*Example 3*

To a solution prepared by admixing 83 grams of concentrated sulfuric acid and 41 grams of 60 percent nitric acid, contained in a reaction flask, there were slowly added with stirring 20 grams of 2-phenoxy-1-ethanol. During the addition, the temperature of the reaction mixture was not allowed to rise above −10° C. by means of a Dry Ice and acetone bath surrounding the flask. Upon the complete addition of the alcohol, the nitrated product was poured onto ice and filtered. The crude 2-(ortho, para-dinitrophenoxy)-1-ethylnitrate thus obtained weighed 24 grams. The nitronitrate ester product was then purified by recrystallization from methanol and exhibited the following properties: melting point: 68° C.; elemental analysis in percent by weight:

|   | Found | Calculated for $C_8H_7N_3O_8$ |
|---|---|---|
| N | 15.28 | 15.38 |

*Example 4*

A mixture containing 100 grams of the 2-(ortho, para-dinitrophenoxy)-1-ethyl nitrate product obtained as described in Example 3, 800 milliliters of isopropyl alcohol and 15 grams of a 5 percent by weight palladium-on-charcoal hydrogenation catalyst was charged to a three-liter hydrogenation bomb and heated at a temperature of between 50° C. and 70° C., under a hydrogen pressure of 150 pounds per square inch. After a reaction period of about 2 hours had elapsed, absorption of hydrogen was no longer observed. The hydrogenated product was then filtered to remove the catalyst and stripped of isopropyl alcohol at a temperature of 35° C., under reduced pressure, whereupon 65 grams of a crude 2-(ortho, para-diaminophenoxy)-1-ethanol product were obtained as a solid residue. Upon recrystallization from a benzene ethanol mixture, the product exhibited the following properties: melting point: 78° C. to 80° C.; elemental analysis in percent by weight:

|   | Found | Calculated for $C_8H_{12}N_2O_2$ |
|---|---|---|
| N | 16.54 | 16.65 |

The hydrogenation of 100 grams of 2-(ortho, para-dinitrophenoxy)-1-ethyl nitrate was repeated in a manner similar to that described above, utilizing however, 10 grams of a 5 percent by weight platinum-on-alumina hydrogenation catalyst instead of palladium-on-charcoal and employing a reaction temperature maintained between 40° C. and 50° C. Upon crystallization from benzene, a 53-gram yield of 2-(ortho, para-diaminophenoxy)-1-ethanol was obtained.

*Example 5*

To test the effectiveness of the diaminophenoxyalkyl alcohols of the invention as hardening agents for resins, a mixture containing 4.2 grams of the 2-(ortho, para-diaminophenoxy)-1-ethanol product obtained as described in Example 4 and 19.2 grams of the diglycidyl ether of 2,2-bis-(4-hydroxyphenyl)propane was heated with stirring at a temperature maintained between 50° C. and 70° C. until a solution was formed. The resulting solution was then poured into an aluminum mold and placed in an oven at a temperature of 120° C. The solution gelled after 30 minutes, and after curing at the same temperature for a period of 30 minutes, a hard, strong, dark-colored resin was obtained, having a Barcol hardness value of 33.

The invention is capable of modification within the scope of the appended claims.

What is claimed is:

1. A process for the production of aromatic aminoalcohols of the formula:

wherein R is selected from the class consisting of the alkylene and oxyalkylene radicals containing at least 2 carbon atoms, said oxyalkylene radicals being connected to the phenyl ring through the oxygen atom thereof, X is selected from the class consisting of hydrogen, halogen and the lower alkyl and lower alkoxy radicals, Y is selected from the class consisting of hydrogen, halogen, the lower alkyl and lower alkoxy radicals and the amino radical, and wherein the hydroxyl radical is connected to the phenyl ring through a chain containing at least 2 carbon atoms: which process comprises nitrating an aromatic alcohol of the formula

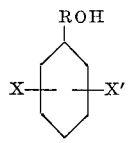

wherein R and X are as defined above, X' is independently selected from the same class defined above by X, and wherein the hydroxyl radical is connected to the phenyl ring through a chain containing at least 2 carbon atoms, thereby forming the corresponding nitronitrate ester of the formula

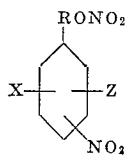

wherein R and X are as defined above, Z is selected from the class consisting of hydrogen, halogen, the lower alkyl and lower alkoxy radicals and the nitro radical, and wherein the nitrate radical is connected to the phenyl ring through a chain containing at least 2 carbon atoms; recovering said nitronitrate ester; reacting said nitronitrate ester with hydrogen in the presence of a catalytic amount of a hydrogenation catalyst; and subsequently recovering the aromatic amino alcohol thereby produced.

2. A process for the production of aromatic aminoalcohols of the formula

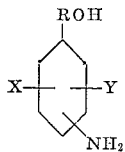

wherein R is selected from the class consisting of the alkylene and oxyalkylene radicals containing from 2 to about 6 carbon atoms, said oxyalkylene radicals being attached to the phenyl ring through the oxygen atom thereof, X is selected from the class consisting of hydrogen, halogen and the lower alkyl and lower alkoxy radicals, Y is selected from the class consisting of hydrogen, halogen, the lower alkyl and lower alkoxy radicals and the amino radical, and wherein the hydroxyl radical is connected to the phenyl ring through a chain containing at least 2 carbon atoms: which process comprises nitrating an aromatic alcohol of the formula

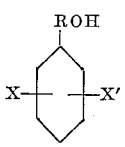

wherein R and X are as defined above, X' is independently selected from the same class defined above by X, and wherein the hydroxyl radical is connected to the phenyl ring through a chain containing at least 2 carbon atoms, by reacting said aromatic alcohol with a nitrating agent containing at least 2 moles of nitric acid per mole of aromatic alcohol undergoing reaction, at a temperature below about 10° C., thereby forming the corresponding nitronitrate ester of the formula

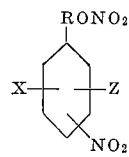

wherein R and X are as defined above, Z is selected from the class consisting of hydrogen, halogen, the lower alkyl and lower alkoxy radicals and the nitro radical, and wherein the nitrate radical is connected to the phenyl ring through a chain containing at least 2 carbon atoms; recovering said nitronitrate ester; reacting said nitronitrate ester with hydrogen at a temperature of between about 0° C. and about 120° C., under a hydrogen pressure of from about 15 pounds per square inch to about 2000 pounds per square inch and in the presence of a catalytic amount of a hydrogenation catalyst; and subsequently recovering the aromatic aminoalcohol thereby produced.

3. A process for the production of paraaminophenylalkyl alcohols of the formula

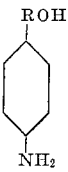

wherein R is an alkylene radical containing from 2 to about 6 carbon atoms and wherein the hydroxyl radical is connected to the phenyl ring through a chain containing at least 2 carbon atoms; which process comprises nitrating an aromatic alcohol of the formula

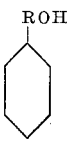

wherein R is as defined above and wherein the hydroxyl radical is connected to the phenyl ring through a chain containing at least two carbon atoms, by reacting said aromatic alcohol with a nitrating agent containing at least 2 moles of nitric acid per mole of aromatic alcohol undergoing reaction, at a temperature below about 0° C., thereby forming the corresponding nitronitrate ester of the formula

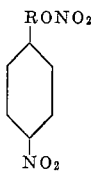

wherein R is as defined above and wherein the nitrate radical is connected to the phenyl ring through a chain containing at least 2 carbon atoms; recovering said nitronitrate ester; and subsequently reacting said nitronitrate ester with hydrogen at a temperature of between about 40° C. and about 90° C., under a hydrogen pressure of from about 100 pounds per square inch to about 1000 pounds per square inch and in the presence of a catalytic amount of a hydrogenation catalyst.

4. A process for the production of 2-(para-aminophenyl)-1-ethanol which comprises reacting 2-phenyl-1-ethanol with a nitrating agent containing at least about 2 moles of nitric acid per mole of 2-phenylethanol undergoing reaction, at a temperature below about 0° C., thereby forming 2-(para-nitrophenyl)-1-ethyl nitrate; recovering said 2-(para-nitrophenyl-1-ethyl nitrate; and subsequently reacting said 2-(para-nitrophenyl)-1-ethyl nitrate with hydrogen at a temperature of between about 40° C. and about 90° C., under a hydrogen pressure of from about 100 pounds per square inch to about 1000 pounds per square inch and in the presence of a catalytic amount of a hydrogenation catalyst.

5. A process for the production of ortho, para-diaminophenoxyalkyl alcohols of the formula

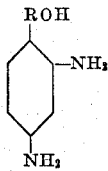

wherein R is an oxyalkylene radical containing from 2 to about 6 carbon atoms and connected to the phenyl ring through the oxygen atom thereof, and wherein the hydroxyl radical is connected to the phenyl ring through a chain containing at least two carbon atoms: which process comprises nitrating an aromatic alcohol of the formula

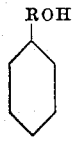

wherein R is as defined above and wherein the hydroxyl radical is connected to the phenyl ring through a chain containing at least 2 carbon atoms, by reacting said aromatic alcohol with a nitrating agent containing at least 3 moles of nitric acid per mole of aromatic alcohol undergoing reaction, at a temperature below about 0° C., thereby forming the corresponding nitronitrate ester of the formula

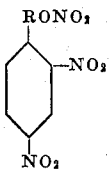

wherein R is as defined above and wherein the nitrate radical is connected to the phenyl ring through a chain containing at least 2 carbon atoms; recovering said nitronitrate ester; and subsequently reacting said nitronitrate ester with hydrogen at a temperature of between about 40° C. and about 90° C., under a hydrogen pressure of from about 100 pounds per square inch to about 1000 pounds per square inch and in the presence of catalytic amounts of a hydrogenation catalyst.

6. A process for the production of 2-(ortho, para-diaminophenoxy)-1-ethanol which comprises reacting 2-phenoxy-1-ethanol with a nitrating agent containing at least 2 moles of nitric acid per mole of 2-phenoxyethanol undergoing reaction, at a temperature below about 0° C., thereby forming 2-(ortho, para-dinitrophenoxy)-1-ethyl nitrate; recovering said 2-(ortho, para-dinitrophenoxy)-1-ethyl nitrate; and subsequently reacting said 2-(ortho, para-dinitrophenoxy)-1-ethyl nitrate with hydrogen at a temperature of between about 40° C. and about 90° C., under a hydrogen pressure of from about 100 pounds per square inch to about 1000 pounds per square inch and in the presence of a catalytic amount of a hydrogenation catalyst.

7. Aminophenoxyalkyl alcohols of the formula

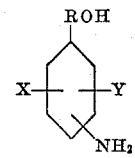

wherein R is an oxyalkylene radical containing from 2 to about 6 carbon atoms and connected to the phenyl ring by the oxygen atom thereof, X is selected from the class consisting of hydrogen, halogen, and the lower alkyl and lower alkoxy radicals, Y is selected from the class consisting of hydrogen, halogen, the lower alkyl and lower alkoxy radicals and the amino radical, and wherein the hydroxyl radical is connected to the phenyl ring through a chain containing at least 2 carbon atoms.

8. Ortho, para-diaminophenoxyalkyl alcohols of the formula

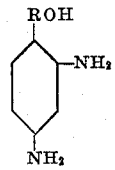

wherein R is an oxyalkylene radical containing from 2 to about 6 carbon atoms and connected to the phenyl ring through the oxygen atoms thereof, and wherein the hydroxyl radical is connected to the phenyl ring through a chain containing at least two carbon atoms.

9. 2-(ortho, para-diaminophenoxy)-1-ethanol.

References Cited in the file of this patent

UNITED STATES PATENTS

| | | |
|---|---|---|
| 1,560,426 | Lewis | Nov. 3, 1925 |
| 2,734,073 | Frevel et al. | Feb. 7, 1956 |
| 2,794,836 | Troutman | June 4, 1957 |

OTHER REFERENCES

Degering: "An Outline of Organic Nitrogen Compounds", pp. 295–96 (1950), Univ. Lithoprinters, Ypsilanti, Mich. (Copy in Scientific Library.)

Boschan et al.: "Chem. Rev." 55, 502–05 (1955). (Copy in Scientific Library.)

UNITED STATES PATENT OFFICE
CERTIFICATE OF CORRECTION

Patent No. 3,037,057

May 29, 1962

Samuel W. Tinsley et al.

It is hereby certified that error appears in the above numbered patent requiring correction and that the said Letters Patent should read as corrected below.

Column 4, line 33, for "itnroduced" read -- introduced --; column 5, line 10, for "2560" read -- 250 --.

Signed and sealed this 20th day of November 1962.

(SEAL)
Attest:

ERNEST W. SWIDER
Attesting Officer

DAVID L. LADD
Commissioner of Patents

Disclaimer 3,037,057.—*Samuel W. Tinsley*, South Charleston, and *John T. Fitzpatrick*, Charleston, W. Va. PRODUCTION OF AROMATIC AMINOALCOHOLS. Patent dated May 29, 1962. Disclaimer filed May 30, 1978, by the assignee, *Union Carbide Corporation*.

Hereby enters this disclaimer to claims 7, 8 and 9 of said patent.

[*Official Gazette August 1, 1978.*]